Dec. 29, 1970     R. C. MARTIN ET AL     3,551,007
CORRUGATED TUBE COUPLINGS AND ADAPTERS
Filed Feb. 5, 1969     4 Sheets-Sheet 1
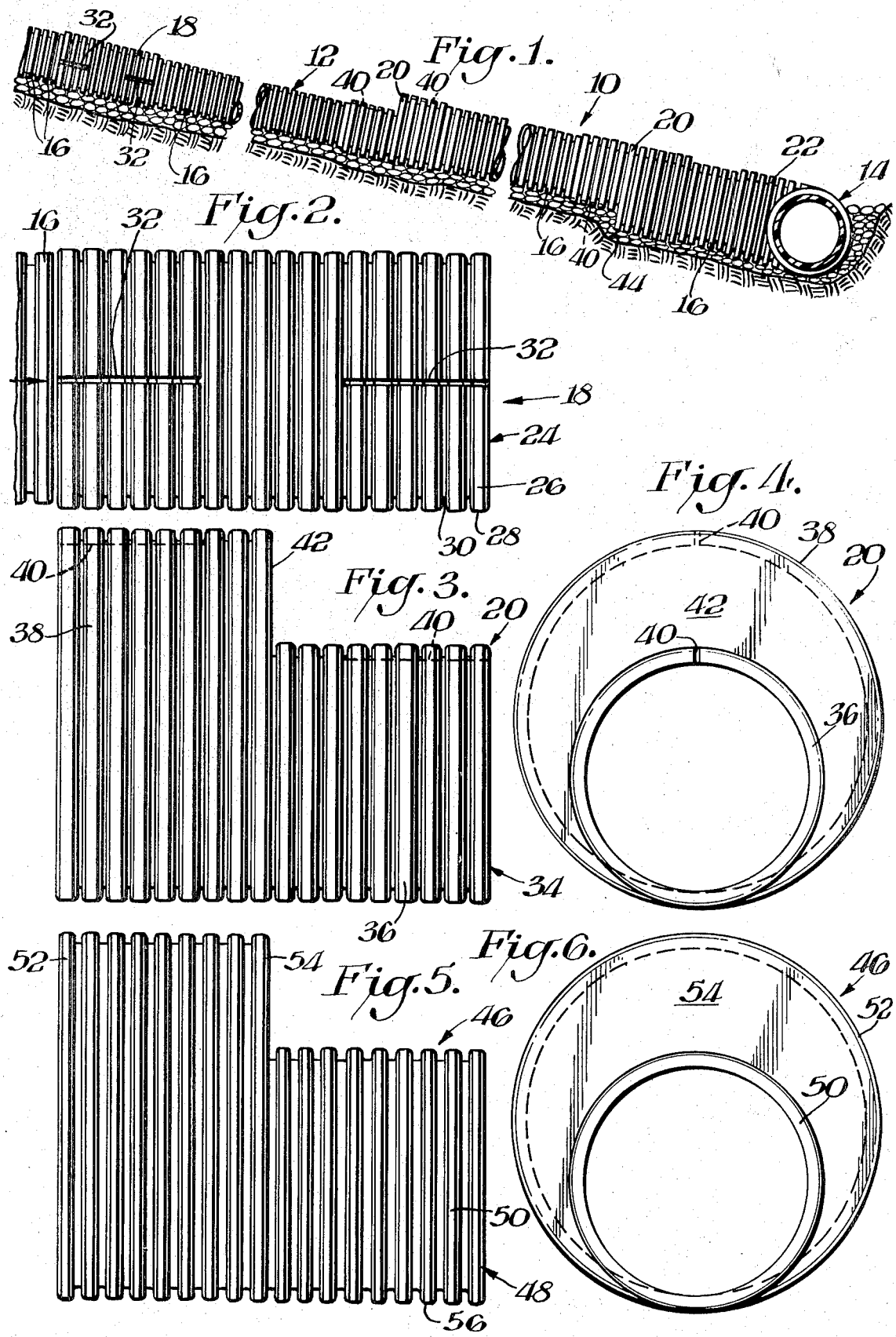

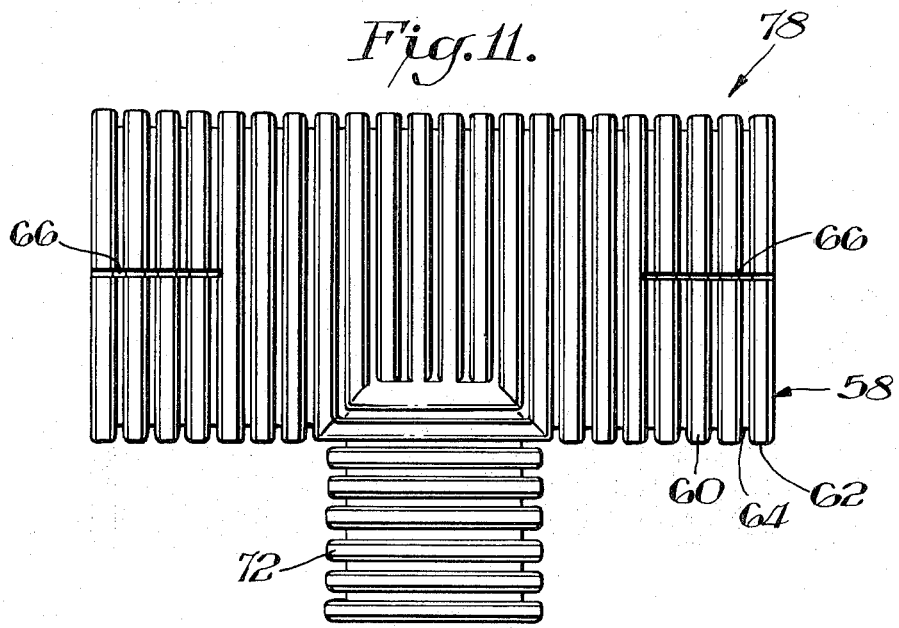
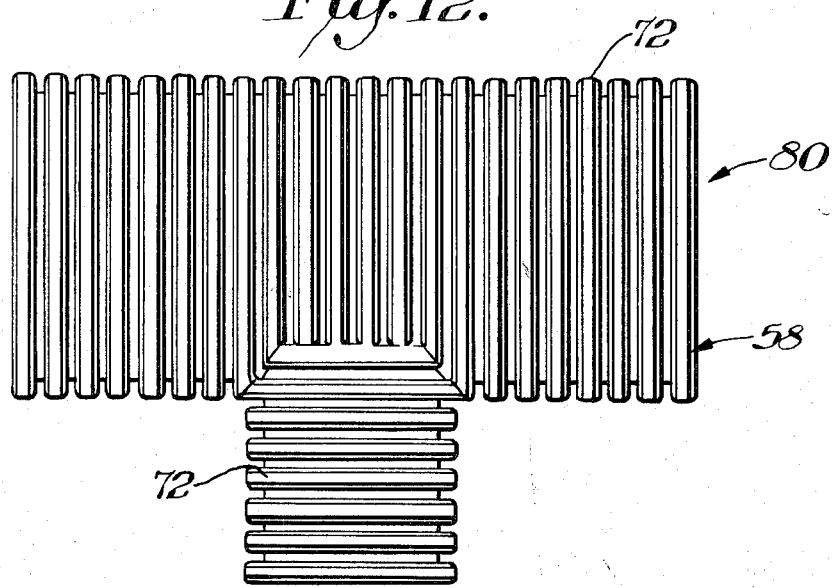

United States Patent Office 3,551,007
Patented Dec. 29, 1970

3,551,007
CORRUGATED TUBE COUPLINGS AND ADAPTERS
Ronald C. Martin, Newark, Del., and Marty E. Sixt, Napoleon, Ohio, assignors to Advanced Drainage Systems, Inc., Newark, Del., a corporation of Delaware
Filed Feb. 5, 1969, Ser. No. 796,752
Int. Cl. F16l 41/00
U.S. Cl. 285—156                    4 Claims

ABSTRACT OF THE DISCLOSURE

Flexible coupling for interconnecting ends of corrugated tubes comprises tubular body section having corrugations formed by alternating annular peaks and valleys. Slit in at least one end portion of tubular body section extends through at least end corrugation thereof, and slitted end portion of tubular body section is constructed and arranged to fit tightly over corrugated tube to be connected to coupling.

BACKGROUND OF THE INVENTION

The present invention relates to couplings and adapters for corrugated tubes, and more particularly to flexible couplings and adapters for interconnecting corrugated drainage tubes having similar or dissimilar cross-sectional configurations.

Subsurface drainage systems fabricated from corrugated tubes are currently playing a major role in land improvement. The advantages of corrugated drainage systems over the heretofore commonly used red clay tile networks are quite numerous. The ease with which the corrugated tubing is manufactured in continuous lengths together with the rather simple and inexpensive installation procedures are but a few factors which have contributed to the overwhelming commercial success of corrugated drainage systems. For the most part such systems include main and lateral subsurface drainage lines comprising corrugated tubing, T's, Y's, couplings or connectors, and adapters of one kind or another. A typical system usually comprises a series of inclined lateral lines spaced from one another in parallel fashion on opposite sides of an inclined main line to which the laterals are connected by either T's or Y's. The lateral lines may be quite long and therefore require tubing of varying cross-sectional area in order to properly handle the ever increasing volume of liquid being drained away through the system.

The required cross-sectional area of the tubing at a particular location in the system is determined by the flow rate and velocity of the draining liquid. Larger flow rates and velocities occur at the lower ends of the inclined lateral lines near their points of connection to the main line. Tubing of increasing cross-sectional area may also be required in the main lines for the same reasons. Thus, interconnecting tubing of similar and dissimilar cross-sectional configurations is often required in constructing a subsurface drainage system. Many times the trenches within which the tubing is to be laid do not meet at the same elevation, especially when the trenches are dug for drainage tubes of different cross-sectional configurations. Connecting tubes together at a point in the trench of varying elevation is difficult and time consuming, and usually requires removal of additional earth or backfilling in the trench of lower elevation prior to positioning the tubing therein.

Accordingly, it is an object of the present invention to provide unique couplings and adapters for interconnecting the ends of corrugated tubes having similar and dissimilar cross-sectional configurations.

Another object of the present invention is to provide novel couplings and adapters for interconnecting the ends of corrugated tubes positioned at slightly different elevations.

SUMMARY OF THE INVENTION

In accordance with the present invention a flexible coupling is provided for interconnecting the ends of corrugated tubes. The coupling comprises a tubular body section having corrugations formed by alternating annular peaks and valleys. A slit in at least one end portion of the tubular body section extends through at least the end corrugation thereof, and the slitted end portion of the tubular body section is constructed and arranged to fit tightly over a corrugated tube to be connected to the coupling.

Preferably, the slit in the tubular body section is substantially parallel to the center line of the slitted end portion. Moreover, the flexible coupling may include a slit in each end portion of the tubular body section extending through at least the end corrugations thereof. Each of the slitted end portions is constructed and arranged to fit tightly over corrugated tubes to be connected to the coupling.

The present invention also includes a flexible coupling having a tubular body section which includes two elongate portions the longitudinal center lines of which are parallel and displaced from one another. The two elongate portions of the tubular body section may be circular in cross-section and the radii thereof different. Also, the center lines of the elongate portions of the tubular body section can be displaced from one another by substantially the difference between the radii of the elongate portions.

Further, the present invention includes a flexible coupling having a tubular body section which is T-shaped. Each of the three end portions of the T-shaped tubular body section may have a slit which extends through at least the end corrugation of each end portion. The slitted end portions of the T-shaped tubular body section are constructed and arranged to fit tightly over corrugated tubes to be connected to the coupling. The T-shaped tubular body section may include a T-shaped central portion having corrugations of substantially the same dimensions as corrugated tubes to be connected to the slitted end portions of the body section. The T-shaped flexible coupling of the present invention may also include selected end portions which have corrugations of substantially the same dimensions as corrugated tubes to be connected to those end portions.

The T-shaped corrugated couplings may be of the reducing type wherein the vertical leg of the T has a somewhat smaller cross-section than that of the horizontal leg. Selected end portions of the reducing T's may include slits which extend through at least the end corrugation in the portion of the T where the slit is located. Also, selected end portions may have corrugations of substantially the same dimensions as corrugated tubes to be connected to those end portions.

BRIEF DESCRIPTION OF THE DRAWING

Novel features and advantages of the present invention will become apparent to one skilled in the art from a reading of the following detailed description in conjunction with the accompanying drawing wherein:

FIG. 1 is a side elevational view of a portion of an installed corrugated drainage system according to the present invention;

FIG. 2 is a side elevational view of a flexible coupling according to the present invention;

FIG. 3 is a side elevational view of another flexible coupling according to the present invention;

FIG. 4 is an end elevational view of the coupling shown in FIG. 3;

FIG. 5 is a side elevational view of another coupling according to the present invention;

FIG. 6 is an end elevational view of the coupling shown in FIG. 5; and

FIGS. 7–12 are top plan views of T-shaped couplings according to the present invention.

DETAILED DESCRIPTION OF THE INVENTION

Figure 7:
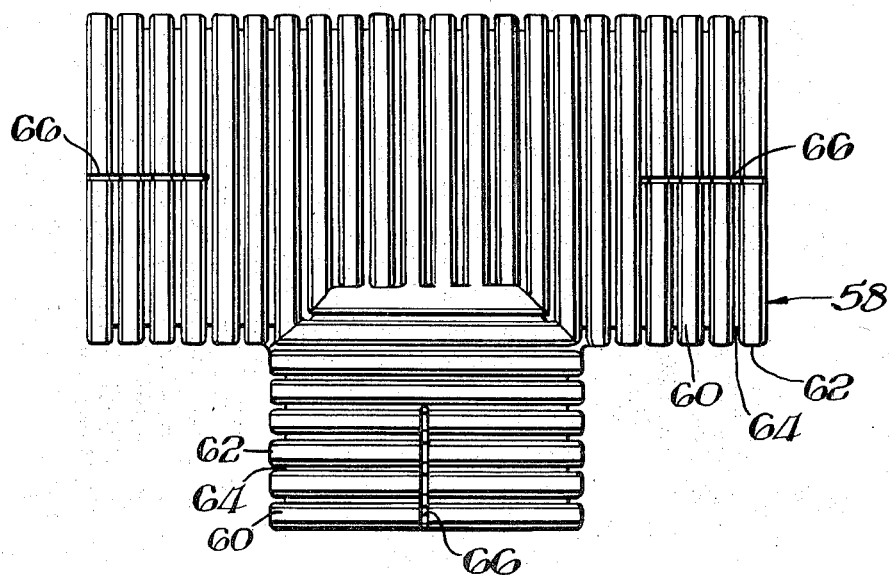

Referring in more particularity to the drawing, FIG. 1 illustrates a portion of a subsurface drainage system 10 comprising a lateral line 12 which empties into a main line 14. For the most part, the drainage system 10 comprises corrugated drainage tubing 16 having identical and different cross-sectional areas. The required cross-sectional area of the tubing 16 is determined at the time of installation of the system and the main factor which affects this determination is the flow rate of draining liquid at the particular location in the system where the tubing is to be installed. As the flow rate increases tubing of larger cross-sectional area is needed. Although not part of the present invention, the tubing 16 has slotted openings (not shown) in the valleys of the corrugations and liquid flows into the tubing 16 through these openings to drain the surrounding earth. Considering the lateral line 12, flexible couplings 18 and 20 are utilized to interconnect the ends of the tubing 16. Coupling 18 interconnects the ends of equal size tubing and coupling 20 is used to interconnect tubing of different sizes. Also, the lateral line 12 is connected to the main line 14 by a T-shaped coupling 22, as described more fully below.

FIG. 2 illustrates the flexible coupling 18 in more detail. Basically, this coupling comprises a tubular body section 24 having corrugations 26 formed by alternating annular peaks 28 and valleys 30. Each end portion of the tubular body section 24 has a slit 32 which extends inwardly from the end thereof. The slits 32 are parallel to the center line of the tubular body section 24 and cut through at least the corrugations at the extremes of the tubular body section. Preferably, the tubular body section 24 has a circular cross-sectional configuration but this configuration depends upon the particular cross-sectional configuration of the tubing 16 to be connected to the coupling. Also, the corrugations 26 of the slitted end portions of the flexible coupling are designed so that they fit tightly over the corrugated tubes 16.

In operation, the slits 32 enable the end portions of the flexible coupling 18 to be slightly expanded so as to increase the internal diameter of the end portions thereof. When an expanded end portion has an internal diameter slightly larger than the external diameter of the corrugated tubing 16, the tubing is urged into mating engagement with the expanded end portion of the coupling 18 and the force utilized to expand the end portion is then released thereby causing the coupling to tightly surround the end of the corrugated tube 16.

The flexible coupling 29 illustrated in FIGS. 3 and 4 comprises a tubular body section 34 having two elongate portions 36, 38. The longitudinal center lines of the elongate portions 36, 38 are parallel and displaced from one another to thereby provide an eccentric relationship, as best shown in FIG. 4. Each end portion of the tubular body section includes a slit 40 which is basically the same as the slits 30 of coupling 18. The interface of the two elongate portions includes a crescent-shaped plate 42 which serves to connect the elongate portions together. Tubing such as 16 is connected to the flexible coupling 20 in the same manner as described above in conjunction with the flexible coupling 18. However, coupling 20 is utilized to interconnect the ends of corrugated tubes having dissimilar cross-sectional areas, as described below.

Interconnecting the ends of corrugated tubes having dissimilar cross-sectional areas, such as the small and large diameter tubing 16 of FIG. 1, is easily accomplished by utilizing the connector 20 in the manner shown in the left-hand and right-hand sides of FIG. 1. When the trench within which the tubing is positioned has a constant unbroken incline the tubes 16 and connector 20 are located as shown to the left in FIG. 1. However, trenches often have slightly different elevations at the point of connection between small and large cross-sectional area tubing and such a point is shown in FIG. 1 at 44. With the aid of coupling 20 this difference in elevation is easily compensated for by simply rotating the connector after the tubing 16 is connected thereto. Such rotation varies the vertical distance between the longitudinal center lines of the elongate portions 36, 38 until the vertical distance therebetwen is approximately equal to the elevational difference at point 44 in the trench. Backfilling and/or further removal of earth is therefore unnecessary and the coupling alone positions the tubing 16 so that it rests in the bottom of the trench, as shown to the right in FIG. 1. Thus, the flexible coupling 20 also functions as an adapter for interconnecting the ends of corrugated tubes at locations in the trench having slight elevational differences.

The flexible coupling 46 illustrated in FIGS. 5 and 6 is in many respects similar to the flexible coupling shown in FIGS. 3 and 4. The corrugated tubular body section 48 includes two elongate portions 50, 52 of different but circular cross-sectional configurations. The elongate portions 50, 52 are connected at their interface by a crescent-shaped plate 54. However, unlike coupling 20 the corrugations 56 of the flexible coupling 46 have substantially the same dimensions as the corrugations of the tubes 16 to be connected thereto. When using the coupling 46 the tubing to be connected is first positioned adjacent the ends of the coupling in abutting relationship therewith. A second coupling piece (not shown) is then utilized to complete the connection. The second coupling piece is corrugated with preferably about six to eight corrugations designed to snap over both the end corrugations of the coupling 46 and the end corrugations of the tubing 16. A longitudinal slit which cuts through each of the corrugations of the second coupling piece enables that coupling to be expanded so as to surround the coupling 46 and tubing 16.

The flexible coupling 22 illustrated in FIG. 2 has a T-shaped body section 58 with corrugations 60 formed by alternating annular peaks 62 and valleys 64. The corrugations are designed so that they tightly surround corrugated tubing such as 16 when the tubing is connected to the T-shaped coupling. Each of the three end portions of the T-shaped coupling has a slit 66 which extends from the end thereof inwardly across at least the end corrugation. Like most T-shaped connectors, the coupling 22 is utilized to construct a three-way tie between two lengths in alignment with each other and a third length disposed at right angles to the aligned pair. In particular the end portions of the coupling 22 are expanded in the same manner as described above in conjunction with couplings 18 and 20 and the tubing 16 inserted therein to effect the three-way interconnection.

Figure 8:
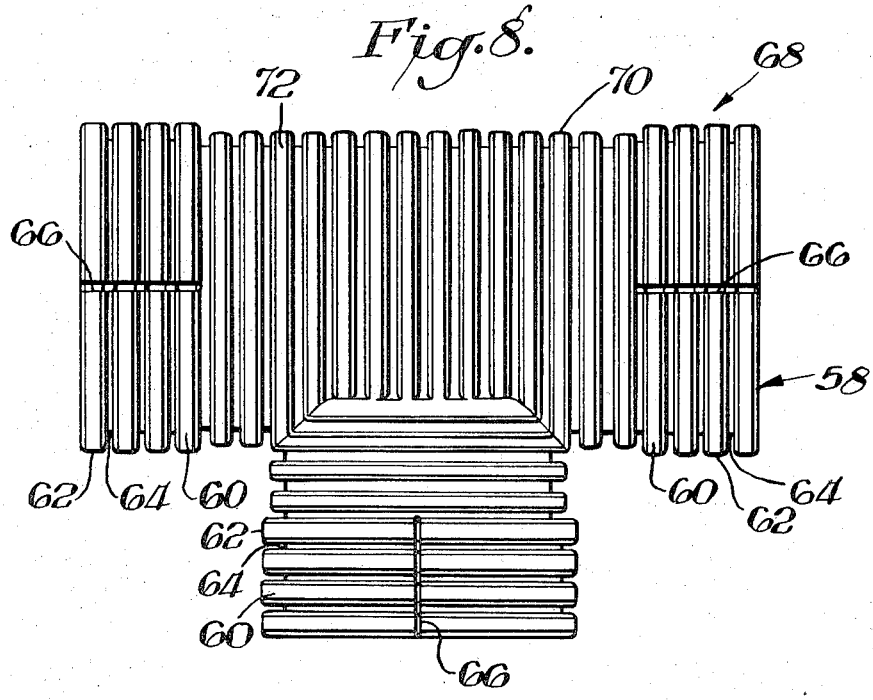

Coupling 68 shown in FIG. 8 has a design substantially the same as the T-shaped coupling 22 illustrated in FIG. 7. However, unlike coupling 22, the tubular body section 58 includes a recessed T-shaped central portion 70 in addition to the three end portions. The T-shaped central portion has corrugations 72 with dimensions substantially the same as the corrugations of tubing 16 to be connected to the slitted end portions of the coupling. When the corrugated tubing is fitted into the ends of the T-shaped coupling 68 the cross-sectional area of the incoming and outgoing tubes is the same as the cross-sectional area of the recessed central portion 70 of the T-shaped coupling. This arrangement prevents the formation of liquid pools in the coupling which might otherwise occur in certain couplings without recessed central portions.

Figure 9:
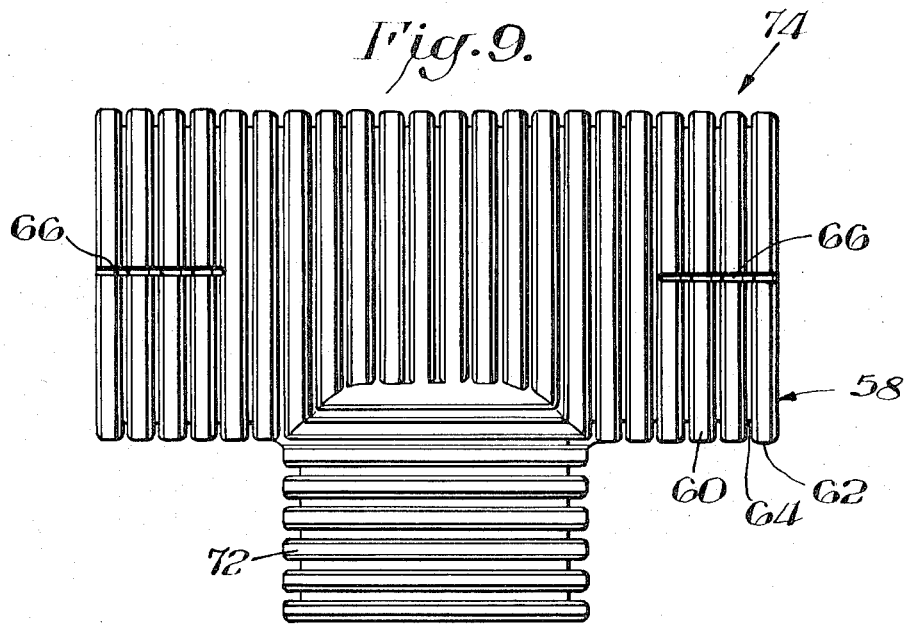

The flexible coupling 74 illustrated in FIG. 9 has corrugations 60 formed in the horizontal leg of the T-shaped body section 58 and corrugations 72 formed in the vertical leg of the body section. As explained above, the corrugations 60 are designed to tightly fit over the tubing 16 connected to the coupling and the slits 66 permit the end portions of the coupling to be expanded to facilitate insertion of the tubing 16. Connection between the vertical leg of the T-shaped body section 58 and the tubing 16 is accomplished with the aid of a second coupling piece (not shown) of the type explained in conjunction with the coupling 46 illustrated in FIGS. 5 and 6.

Figure 10:
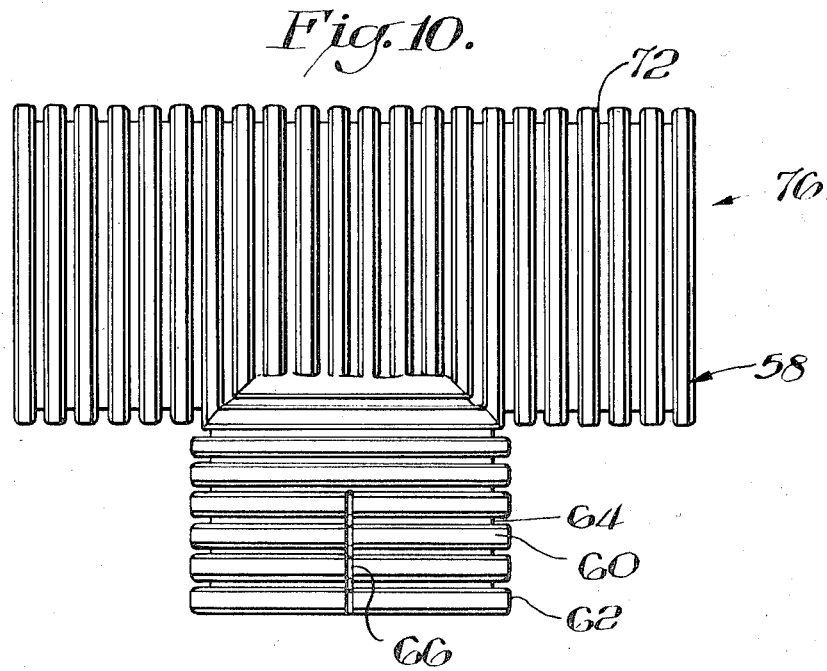

The flexible coupling 76 shown in FIG. 10 has corrugations 72 formed in the horizontal leg of the T-shaped body section 58 and corrugations 60 formed in the vertical leg of the body section. Interconnection of the tubing 16 and coupling 76 is accomplished as described above.

FIGS. 11 and 12 illustrate reducing T-shaped corrugated couplings according to the present invention. The reducing T 78 shown in FIG. 11 is in many respects similar to the T-shaped coupling 74 illustrated in FIG. 9, and similar parts are identified by similar reference characters. The primary distinction between the couplings of FIGS. 9 and 11 resides in the provision of a vertical leg in coupling 78 which is somewhat smaller in cross-section than the corresponding portion of coupling 74. Also, the cross-section of the vertical leg of coupling 78 is smaller than the cross-section of the horizontal leg of that coupling. Thus, the coupling 78 is appropriately classified as a reducing T.

As noted above, the T-shaped coupling 80 shown in FIG. 12 is also of the reducing type. Like coupling 78, the reducing T 80 also includes a vertical leg having a somewhat smaller cross-section than the cross-section of the horizontal leg of the coupling. The corrugations 72 are of substantially the same dimensions as the corrugated tubing to be connected to the coupling.

Other variations of the corrugated reducing T's of the present invention are also available. For example, the vertical leg of the reducing T may include a slit, such as 66, and oversized corrugations, such as 60. Also, the horizontal leg may comprise corrugations, such as 72, of substantially the same dimensions as the tubing to be connected to the horizontal leg. Other modifications are also within the scope of the present invention.

What is claimed is:

1. A flexible coupling for interconnecting the ends of corrugated tubes comprising a T-shaped tubular body section having corrugations formed by alternating annular peaks and valleys, a slit in each of the three end portions of the T-shaped tubular body section, each slit extending through at least the end corrugation of each end portion and terminating short of the mid-portion of the body section, and the slitted end portions of the tubular body portion being constructed and arranged to fit tightly over corrugated tubes to be connected to the coupling.

2. A flexible coupling as in claim 1 wherein the T-shaped tubular body section comprises a corrugated T-shaped central portion and the three slitted end portions, the T-shaped central portion having corrugations of substantially the same dimensions as corrugated tubes to be connected to the slitted end portions.

3. A flexible coupling for interconnecting the ends of corrugated tubes comprising a T-shaped tubular body section having corrugations formed by alternating annular peaks and valleys, the T-shaped body section including opposite end portions in alignment with each other and a third end portion, the third end portion having a slit extending through at least the end corrugation thereof and terminating short of the mid-portion of the body section, the slitted end portion being constructed and arranged to fit tightly over a corrugated tube to be connected thereto, and the opposite end portions of the tubular body section having corrugations of substantially the same dimensions as corrugated tubes to be connected thereto.

4. A flexible coupling for interconnecting the ends of corrugated tubes comprising a tubular body section having corrugations formed by alternating annular peaks and valleys, the tubular body section including two integral elongate portions the longitudinal center lines of which are parallel and displaced from one another, the two elongate portions of the tubular body section having circular cross-sections of different radii with the center lines of the elongate portions displaced from one another by the difference between the radii, and a single slit in each end portion of the tubular body section terminating short of the mid-portion of the body section, each slitted end portion of the tubular body section being constructed and arranged to tightly fit over corrugated tubes to be connected to the coupling.

References Cited

UNITED STATES PATENTS

| 290,045 | 12/1883 | Hardy | 285—178X |
| 319,144 | 6/1885 | Stephens et al. | 285—CUX |
| 898,510 | 9/1908 | Schlafly | 285—424 |
| 2,005,969 | 6/1935 | Cornell | 285—177 |

FOREIGN PATENTS

| 627,065 | 9/1961 | Canada | 285—417 |
| 604,573 | 7/1948 | Great Britain | 285—417 |
| 908,930 | 10/1962 | Great Britain | 285—SFUX |

DAVE W. AROLA, Primary Examiner

U.S. Cl. X.R.

285—178, 417